June 4, 1935.　　　　C. L. BEST　　　　2,003,528
WEAR COMPENSATING MEANS
Filed Aug. 15, 1932　　　2 Sheets-Sheet 1

INVENTOR.
Clarence L. Best
BY
ATTORNEY.

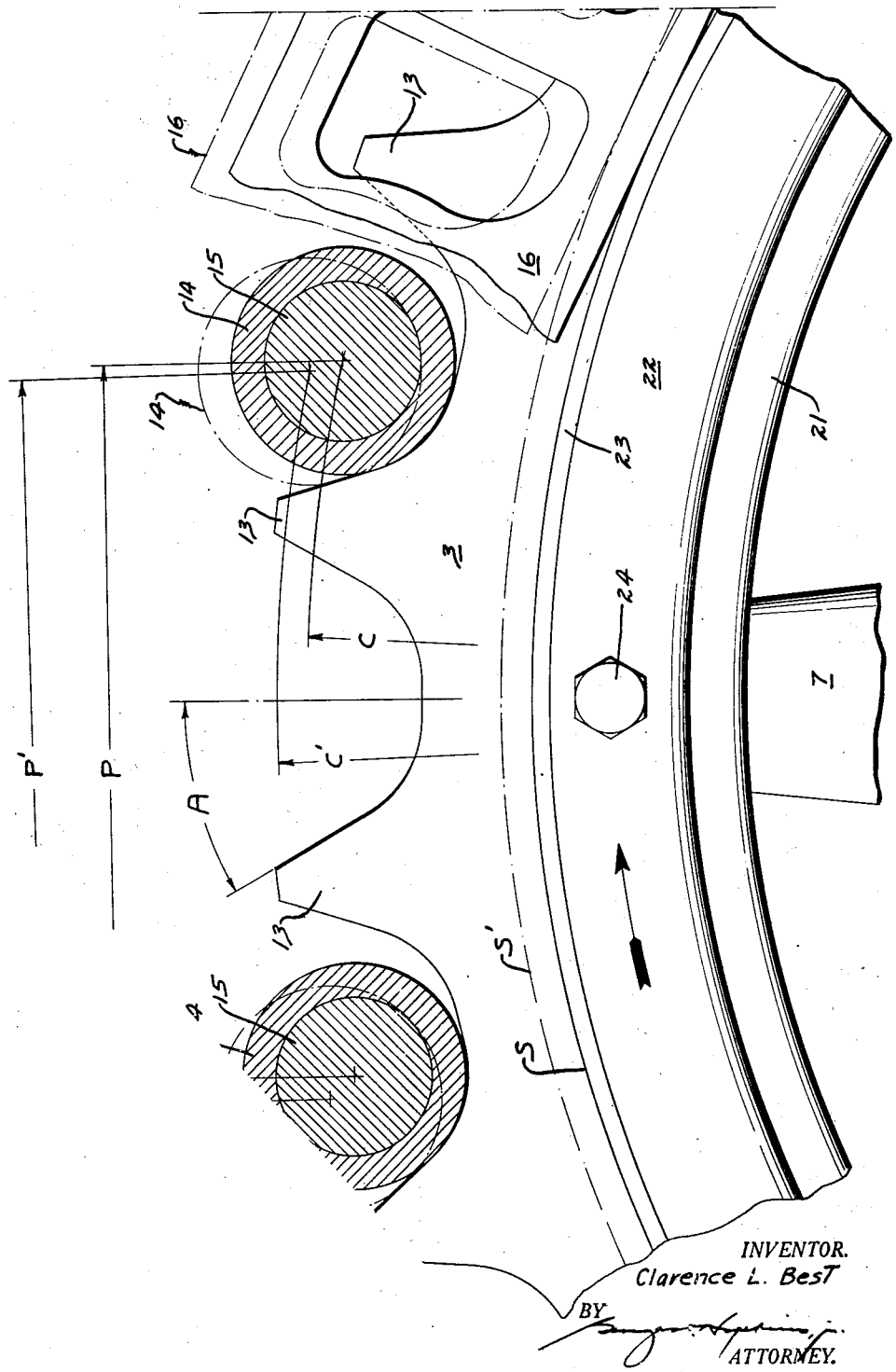

Patented June 4, 1935

2,003,528

UNITED STATES PATENT OFFICE 2,003,528

WEAR COMPENSATING MEANS

Clarence L. Best, Mission San Jose, Calif., assignor to Caterpillar Tractor Co., San Leandro, Calif., a corporation of California Application August 15, 1932, Serial No. 628,838

11 Claims. (Cl. 74—243)

My invention relates to means for compensating for wear; and particularly to such means adapted to compensate for relative wear between a sprocket wheel and a chain therefor, whereby a proper pitch relationship between the wheel and the chain may be always maintained.

In tractors of the track-type, wherein the tractor is propelled by means of a driven sprocket wheel engaging the chain of an endless self-laying track, the pitch of the chain is initially predetermined with respect to the sprocket teeth, so that the chain spools engage a plurality of teeth in driving contact, on a predetermined pitch circle. Thus, when the parts are new, driving contact obtains with minimum stress. Upon development of play at the pivotal chain connections, caused by wear, the pitch of the chain increases. Increase of the chain pitch results in only one tooth of the sprocket wheel being in driving contact with a spool of the chain, thus placing undue strain on the single tooth, which is undesirable. Dirt and other foreign matter is apt to collect between the chain and sprocket wheel, particularly when the tractor is driven over muddy ground, and this will affect the predetermined pitch relationship.

My invention is designed to obviate the foregoing difficulties; and it is, therefore, a broad object of my invention to provide a supporting or wearing surface which is adjustable to compensate for wear.

Another object of my invention is to provide means, whereby material caught between a sprocket wheel and a chain may be ejected.

Another object of my invention is to provide, with a sprocket wheel of the character described, means whereby a proper pitch relationship between the wheel and the chain may be maintained regardless of wear.

Another object of my invention is to employ supporting means for the chain on a sprocket wheel, which is of such character as to diminish noise.

An additional object of my invention is the provision of a simple and economical structure for obtaining the foregoing objects.

A further object of my invention is the provision of a removably secured supporting or wearing surface, on a wheel of the character described, which may be replaced by another such surface when worn to an extent precluding further use.

Other objects of my invention will become apparent from a perusal of the following description thereof.

Reference will now be made to the drawings for a detailed description of a preferred embodiment of my invention, as employed in a sprocket wheel of a track-type tractor:

Fig. 4 is a more or less diagrammatic, enlarged and fragmentary sectional elevation of portions of a sprocket wheel and chain, illustrating the manner in which the device of my invention functions.

Figure 1:
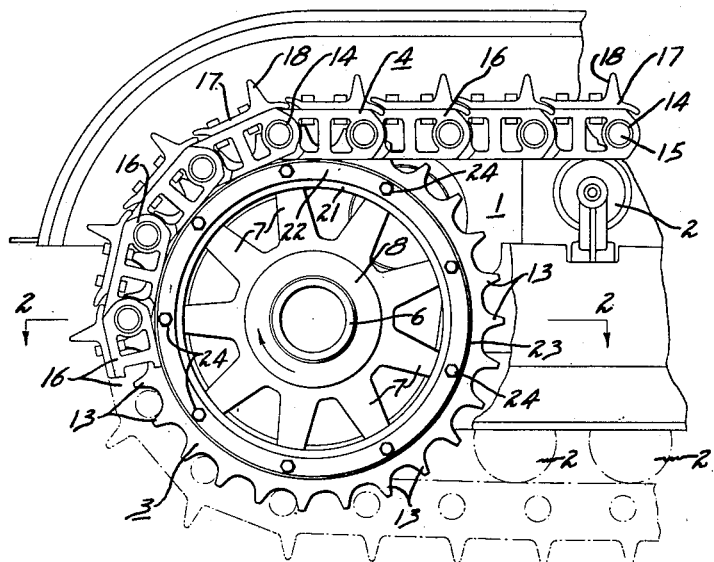
Fig. 1 is a side elevation of a portion of a track-type tractor, and of the sprocket wheel of my invention employed therewith. A part of the structure is omitted from the view and a part is shown in dotted lines, for the purposes of illustration.

With reference to Fig. 1, the tractor of the track-type, wherein the sprocket wheel of my invention finds great utility, is indicated by reference character 1, and comprises the track rollers 2 and the driven rotatable sprocket wheel 3 engaging endless track 4. Sprocket wheel 3 comprises hub 6 adapted to be splined for rotation with the final drive shaft (not shown) of the tractor.

Figure 2:
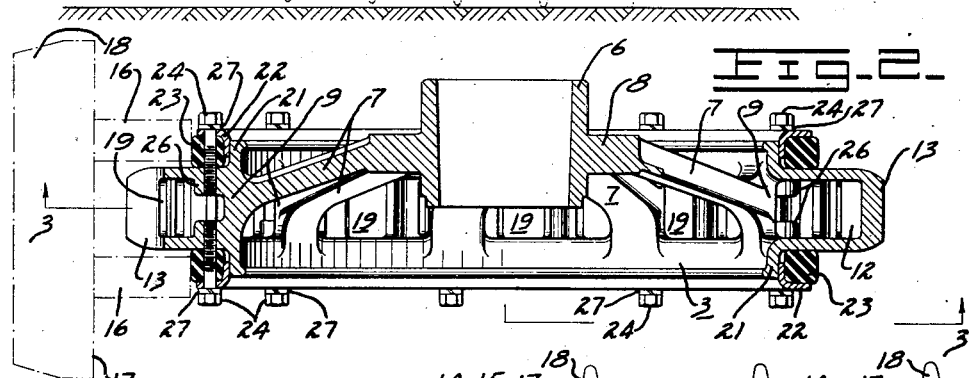
Fig. 2 is a horizontal sectional view taken in a plane indicated by line 2—2 in Fig. 1. The track including the sprocket chain is shown in dotted lines.

Spokes 7 (Fig. 2) extend radially and outwardly from the annular flange 8 formed integral with hub 6. Each spoke 7 terminates in an integral cross web 9; and the webs are peripherally spaced about the sprocket wheel to provide openings 11 (Fig. 3) between the webs. Integral with webs 9 is an annular non-adjustable channel or rim 12, open at the bottom and the periphery of which is formed with sprocket teeth 13, between which spools 14 of the track chain are adapted to engage. The track chain comprises spaced chain sections 16 forming rails, the links of which are pivotally connected by spools 14 and by pins 15 in the spools. Track shoes 17, having grousers 18, are attached to the track chain.

As can be seen most clearly from Fig. 4, the sides of sprocket teeth 13 are at a high-pressure angle A; and as shown, such angle is approximately 30°, for a purpose to be subsequently described. The sprocket teeth sides may, however, be at other suitable high-pressure angles, preferably in excess of 20°.

Figure 3:
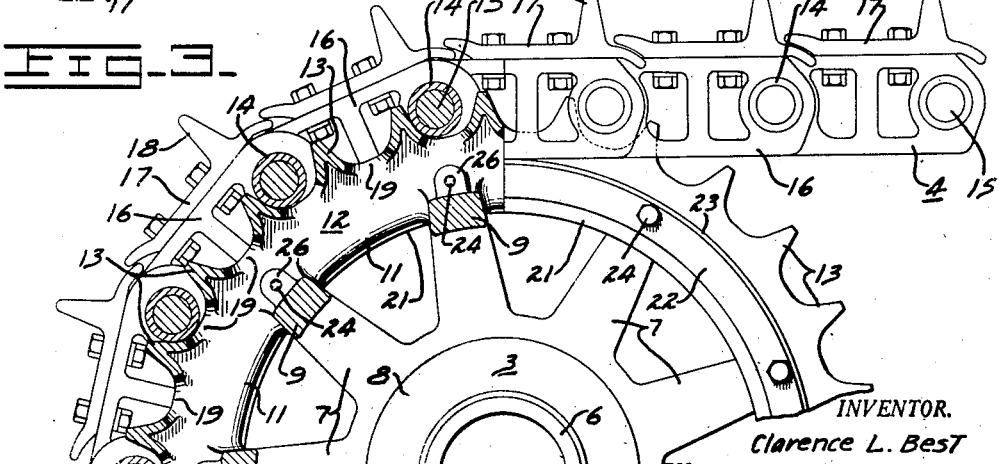
Fig. 3 is a fragmentary sectional elevation taken in planes indicated by line 3—3 in Fig. 2.

Referring particularly to Fig. 3, apertures 19 are formed between teeth 13, which allow ejection of material caught between the track and the sprocket wheel. It is to be observed, from Fig. 2, that spokes 7 and the hub 6 are offset with respect to the rim of the sprocket wheel and with respect to the apertures 19. Consequently, the spokes and the hub are substantially out of the path of material which is ejected through apertures 19.

Means is provided for adjustably supporting the track chain on the sprocket wheel, so that a proper pitch relationship between the chain and the sprocket wheel may be maintained. Annular outwardly-projecting flanges 21 are formed integral with and on each side of the sprocket wheel, substantially in line with webs 9. Encircling and seated on each flange 21 is a clamping ring 22, L-shaped in section; and rings or strips 23 of resilient and compressible material such as rubber, are seated in the clamping rings 22. The rubber rings 23 are adjustably held between clamping rings 22 and the side surfaces of channel 12, by means of cap screws 24 threaded in bosses 26 (Fig. 3) formed integral on the inner walls of channel 12. Lock washers 27 are interposed between the cap screw heads and the clamping rings. The rails of the chain links are adapted to ride on the rings 23 as the sprocket wheel is driven, which rings extend above the clamping rings 22 to provide supporting surfaces for the rails. With particular reference to Figs. 3 and 4, it is to be noted that rings 23 prevent contact of the spools 14 with the bottom surfaces of the spaces between teeth 13. Thus clearance obtains between the spools and such surfaces; and each spool is compelled to contact with the side of a tooth at a predetermined point, with the centers of the spools lying on the initial pitch circle C (Fig. 4).

From the preceding description, it is apparent that should play develop at the pivotal connections of the track links, due to wear, so as to cause change in the chain pitch from the initial predetermined pitch P to an increased pitch P' (Fig. 4), the resilient rings 23 may be compressed, to compensate for such wear, by tightening of cap screws 24. By such compression, the surface of the rings contacting with the track may be raised from a position S to a position S', so as to support the chain in an expanded position, with the centers of the spools 14 (as indicated by the phantom circles) lying on an increased pitch circle C'. Since the sides of the teeth are at a high-pressure angle, it is apparent that this will still result in a plurality of the spools contacting a plurality of teeth, when the rubber ring is compressed to support the chain at the increased pitch circle C', determined by the amount of play which the chain developed. Hence, means is provided for obviating destructive stresses which might otherwise result from change in pitch relationship. Inasmuch as rings 23 are preferably of rubber, it is apparent that noise is diminished.

Apertures 19 preclude material from packing at the bottom of the space between teeth, since material, which might be caught between teeth and a spool of the sprocket chain when such spool enters the space between the teeth, is ejected. Furthermore, should material become packed in the space between rails of the track, at the position where the sprocket wheel engages the track adjacent the ground, the material is free to escape through apertures 19. Hence, the apertures insure that the spools engage the teeth at the proper pitch circle, which might not otherwise be the case if material were permitted to pack and thus force the spools out of alinement. It is thus apparent that the apertures cooperate with rings 23 to maintain a proper pitch relationship between the sprocket wheel and the chain.

In case the rings 23 become worn to an extent precluding further use thereof, it is apparent that they may be replaced by new rings quickly and easily, because of the quickly detachable nature of the adjustable clamping and securing means.

Although I have described rubber as the preferred material for the expansible and detachably secured rings 23, it is apparent that any other suitable material, which is compressible and more or less resilient, may be employed.

It is seen that I have provided means in a sprocket wheel for maintaining a proper pitch relationship between a sprocket wheel and chain. Such means is of particular applicability in a track-type tractor sprocket wheel; and I have consequently chosen for the purpose of illustrating my invention the application thereof with the described type of sprocket wheel. However, it is apparent that the principle of my invention may be employed any place, where it might be desired to provide means for compensating for wear.

I, therefore, claim as my invention:

1. A track-type tractor sprocket wheel adapted to engage an endless chain forming part of the tractor track, a resilient ring on said wheel adapted to contact said chain, and means for adjustably clamping said ring.

2. A track-type tractor sprocket wheel adapted to engage an endless chain forming part of the tractor track, a ring removably secured to said wheel and adapted to contact said chain, and means for expanding said ring to increase the effective pitch diameter of said sprocket wheel.

3. A track-type tractor sprocket wheel adapted to engage an endless chain forming part of the tractor track, a ring mounted on said sprocket wheel for lateral adjustment with respect thereto, and a resilient annular member interposed between said wheel and said ring providing a wearing surface for said chain, lateral adjustment of said ring expanding said surface.

4. A track-type tractor sprocket wheel having an annular portion of compressible material adapted to support an endless chain forming part of the tractor track, and means for compressing said annular portion laterally to expand the chain-engaging surface thereof radially.

5. A track-type tractor sprocket wheel comprising a hub, integral spokes extending radially from said hub, an annular rim integral with said spokes, teeth on said rim, laterally projecting annular flanges on said rim, resilient rings about said flanges, and clamping rings engaging said resilient rings and secured to said rim.

6. A track-type tractor sprocket wheel comprising a hub, integral spokes extending radially from said hub, an annular rim integral with said spokes, teeth on said rim, laterally projecting annular flanges on said rim, resilient rings about said flanges, clamping rings engaging said resilient rings, and means for adjusting said clamping rings laterally with respect to said rim, to expand the outer surface of said resilient rings radially.

7. A wheel member having a rim over which an endless chain member is adapted to travel, compressible material mounted on one of said members and having a surface for engaging the other of said members, and pressure applying clamping means for said material adjustable to vary the position of said surface radially with respect to said wheel.

8. A wheel member having a rim over which an endless chain member is adapted to travel, compressible material mounted on one of said members and having a surface for engaging the other of said members, and means for adjusting the position of said surface radially with respect to said wheel including a clamping member adjustable to compress said material laterally.

9. A wheel member having a rim over which an endless chain member is adapted to travel, compressible material mounted on one of said members and having a surface for engaging the other of said members, and means for adjusting the position of said surface radially with respect to said wheel including a clamping member extending laterally through said material and adjustably secured to the member upon which the material is mounted.

10. A wheel having a rim over which an endless chain is adapted to travel, compressible material mounted around said wheel adjacent said rim for engaging said chain, and pressure applying clamping means on said wheel adjustable laterally with respect to said wheel to expand said material radially.

11. A wheel having a rim over which an endless chain is adapted to travel, compressible material mounted around said wheel adjacent said rim for engaging said chain, a clamping member engaging a side of said material, and fastening means engaging said clamping member and adjustably secured to said wheel to move said clamping member laterally with respect to said wheel and expand said material radially.

CLARENCE L. BEST.